April 14, 1959

G. BERTAUX 2,882,333

ELECTRIC CABLE JOINTS

Filed March 29, 1955

United States Patent Office 2,882,333
Patented Apr. 14, 1959

2,882,333

ELECTRIC CABLE JOINTS

Gerard Bertaux, Jeumont, France, assignor to Forges et Ateliers de Constructions Electriques de Jeumont, Paris, France, a corporation of France Application March 29, 1955, Serial No. 497,729

Claims priority, application France April 8, 1954

4 Claims. (Cl. 174—90)

This invention relates to joints for electric cables. It is known that, in order to produce electric transmission cables of great length such for example as submarine cables, it is necessary to connect up by means of appropriate joints, a plurality of shorter lengths, as manufactured. These joints, which are generally effected by soldering, have numerous well-known disadvantages, such as the increased diameter and greater rigidity of the cables at the joined ends.

The present invention has for its main object to provide improved cable joints which are distinguished by the absence of all increase of thickness, by a solidity and flexibility practically equal to those of the cables themselves, and by dielectric qualities which are also equivalent to those of the cables.

The invention also has for another object to provide cable manufacturing means for making these improved joints without soldering or welding the external cable-sheath made of lead or other material, and for producing jointed cables of unlimited length which are uniform geometrically, mechanically and electrically.

Other objects and advantages of the invention will appear from the following description, given with reference to the accompanying drawing, wherein.

According to one aspect of the invention, the conductive "cores" of the two cables are interconnected by a plurality of short sleeves or clamping rings, preferably made of copper and spaced at intervals, the various conductor wires of the cable being cut and abutted endwise at points distributed at intervals corresponding to the spacing of the sleeves and the latter being compressed so as to become embedded in the mass of interengaged core wires.

Preferably the sleeves or clamping rings which are compressed so as to have the same external diameter as the cores, are spaced or offset in relation to one another by a distance approximately equal to the pitch of the outer layer of the core wires. The number of sleeves is preferably equal to three, so that about a third of the conductor wires are cut in the plane of each sleeve, the other two-thirds of the wires being uninterrupted in this plane.

Figure 1:
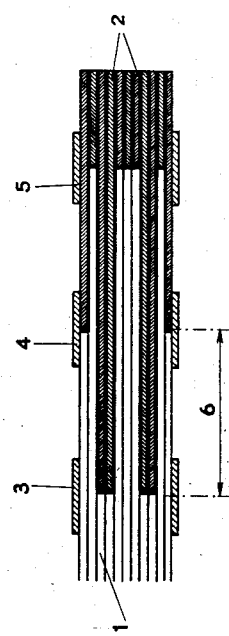
Fig. 1 represents diagrammatically, in section, a cable joint in accordance with the invention.

Fig. 1 represents diagrammatically in section the assembled parts of a joint between two stranded cables 1 and 2, it being supposed (in order to simplify the drawing, and contrary to reality) that the individual conductor wires of each cable core are straight and all parallel to one another. This jointly assembly is clamped by three sleeves or rings of copper, 3, 4 and 5, which are represented before their reduction of diameter, so that in Fig. 1 they still constitute an excess thickness.

Inside each sleeve or ring 3, 4, 5, about 33% of the conductor wires of each cable are cut and abutted endwise against corresponding wires of the other cable, these abutting ends being interengaged with the remaining 66% of the wires, which are not cut at this point. This will correspond to a tensile strength of at least 66% of the normal core, part of the interruptions of the wires being situated in the sleeve 3, another part in the sleeve 4 and a third in the sleeve 5.

Preferably the distance 6 between the center-lines of the sleeves is approximately equal to the pitch of the helices formed by the conductor wires on the outer layer of the core. The result is that the bending facility of the cable is not reduced, but at the same time the wires have no tendency to become detached in the course of bending.

Figure 2:
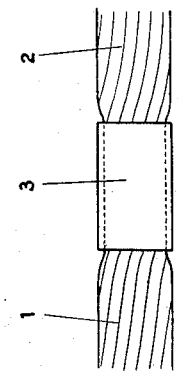
Fig. 2 is a detailed view representing one junction sleeve in position upon the cables.

With the aid of an appropriate tool, for example such as described hereinafter, the sleeves 3, 4, 5 are strongly compressed, so as to reduce their diameter and to embed them in the mass of core wires. As represented in Fig. 2, the sleeve 3 for example assumes an external diameter substantially equal to that of the core, being embedded in the mass of the stranded cables 1 and 2, and penetrating into the cavities existing between the external core wires. There results from this arrangement an electrical conductivity of the completed joint equivalent to that of the core, especially in view of the fact that at each sleeve or ring 3, 4, 5, two-thirds of the conductor wires are not cut.

Figure 3:
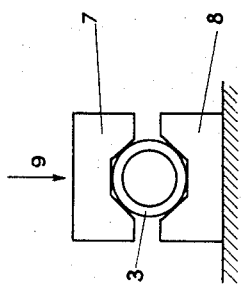
Fig. 3 represents diagrammatically a press for compressing said sleeve around the joint.

The compression of the sleeves or rings can be effected for example by an hydraulic press provided with two or more jaws 7 and 8, which may have the polygonal form represented in Fig. 3; the direction 9 of the force exerted by the press can be changed gradually in relation to the sleeve 3, 4 or 5, during successive operations for its compression around the core wires.

The described joint structure comprising a plurality of spaced sleeves or clamping rings provides yet another important advantage:

When the core is exposed to tensional strain, which may for example result from bending, the helical wires forming its outer layer press hard upon the subjacent layers of the conductor wires, thus preventing or opposing relative sliding movement of the core wires. This self-clamping effect greatly increases the tensile breaking strength, which becomes practically equivalent to that of the normal core.

The improved cable joint thus constituted permits of manufacturing conductor cores of indefinite length having a constant diameter and practically homogeneous mechanical and electrical properties. These cores can be used for manufacture of cables of any length, using any appropriate technique for their insulation, twisting and protection. It is also possible to use cable joints of this type to interconnect lengths of insulated cables, this being represented diagrammatically in Fig. 4, in which a cable-joint according to the invention is seen in partial section, during its production.

The cables 12 and 13 to be jointed together do not yet possess their outer sheaths nor armourings. The conductor wires 1 and 2 of the two cores to be joined are bared, so that the insulations of the two cables present, as usual, conical shapes 10 and 11. The junction sleeves 3, 4 and 5 are placed on the wires 1 and 2, the latter being cut to the desired lengths and interengaged within the sleeves, as described above.

Upon the conical ends 10 and 11 of the cable insulations, there are wound, in an ultra-dry atmosphere, successive layers 14 of paper which is preferably not impregnated but carefully dried in advance, this paper being preserved, before winding, in an ultra-dry atmosphere. In the course of the winding, the cones 10 and 11 are carefully heated and sponged in order to prevent escape of impregnating liquid from the two joined cables. Since the sleeves 3, 4 and 5 do not constitute excess thickness as compared with the cores 1, 2, the operation of winding the paper 14 present no difficulties; the joint obtained presents, as shown in Fig. 4, the same external diameter as the cables 12 and 13 themselves.

Figure 4:
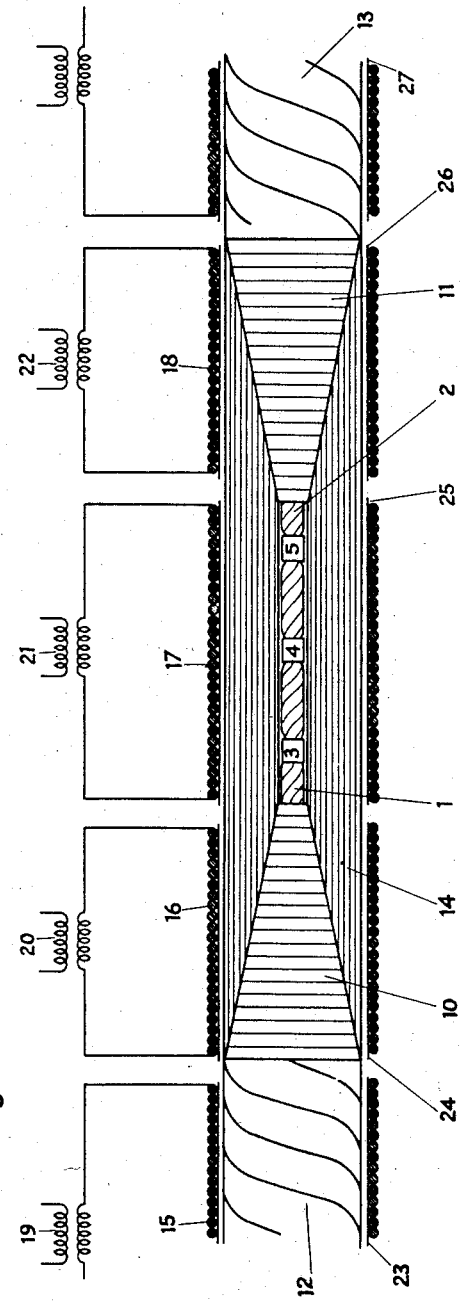
Fig. 4 is a longitudinal section of an insulated cable joint in accordance with the invention, showing diagrammatically specific means for completing and testing the joint.

After the winding of the unimpregnated but carefully dried paper layers 14, placed as shown in Fig. 4 on the cones 10 and 11, a plurality of heating coils 15, 16, 17, 18, etc. are placed over the insulation 14; these coils can be fed for example by corresponding heating transformers 19, 20, 21, 22, etc. This heating, which is effected in vacuo, eliminates all traces of residual humidity which might exist in the jointed cable ends or be added in the course of the production of the joint.

Before effecting impregnation of the cable-joint in vacuo, it is possible, in accordance with another aspect of the invention, to verify the electrical characteristics, such as the insulation resistance of the various parts of the joint, using to this end, as separate testing electrodes, the various heating coils 15, 16, 17, 18, etc. In order to insulate them from one another electrically, the usual electrostatic screen of metallized paper which is used for producing a uniform distribution of the electrostatic field, is cut into a plurality surrounding the paper 14 is cut into a plurality of separate sections 23, 24, 25, 26, 27.

Before effecting impregnation of the cable-joint in vacuo, it is possible, in accordance with another aspect of the invention, to verify separately the electrical characteristics of the various parts of the joint such as the resistances of the insulation or the dielectric loss factors. For that purpose the various heating coils 19, 20, 21, 22 etc., are carried by distinct sections 23, 24, 25, 26, 27 etc., of interposed metallized paper which surrounds the insulating paper 14, those sections being used as separate electrodes or separate screens in connection with suitable measuring devices.

If the electrical tests give satisfactory results, the impregnation of the cable joint is effected under conditions identical with those used for the cables 12 and 13 themselves.

In the above there has been described by way of example the use of carefully dried paper for the joint insulation 14. It is equally possible to use the usual technique with pre-impregnated paper, but since the operation of wrapping the joint takes place in workshops where all the necessary precautions can be taken to eliminate humidity completely, the use of paper which is preferably pre-dried is a perfectly practical method for providing insulation which is equivalent to that of the cable.

The jointed cable thus obtained having a constant diameter, it is sufficient to pass it through an extrusion press or like machine, in order to coat it with an external sheath of lead or other suitable material, with or without armouring wires. The length of this cable is only limited by the possibilities of transport, and one of its important advantages is that it will comprise an absolutely continuous lead or other sheath, having no soldering, welding, or other break in its continuity. As has been indicated above, this cable, of unlimited length, has at all points a diameter which is strictly constant, and practically uniform mechanical and electrical characteristics, the cable being therefore a new industrial product of great value.

What I claim and desire to secure by Letters Patent is:

1. A cable joint for joining two identical electrical sheathed insulated cables having cores consisting of a plurality of wires and each cable having its core wrapped with insulation and the end to be jointed having the insulation tapered in a direction toward the end of the cable, comprising a plurality of clamp sleeves spaced at regular intervals on the cores and each containing a number of wires equal to that of a core, the wires of each core being divided into a plurality of portions, each wire of one portion terminating within one of said sleeves adjacent a corresponding wire of the other core, said sleeves being constricted and embedded in the interengaged wires of the cores whereby the mechanical and electrical characteristics and the geometry of the two cables is maintained substantially uniform throughout the full length of the joined cables.

2. A cable joint according to claim 1, in which said core wires are arranged in a spiral formation, the sleeves being constricted so as to have the same external diameter as the cores, said sleeves being spaced from one another by a distance approximately equal to the pitch of the outer layer of core wires and insulation wrapped around the cores at the joint without exceeding the overall diameter of the cables.

3. A cable joint according to claim 1, comprising three sleeves, substantially one-third of the wires of both cables terminating and abutting endwise within each sleeve, the other two thirds of the wires passing through said sleeve without interruption.

4. A method of joining sheathed insulated cables having paper insulation and cores consisting of a plurality of conductive wires which comprises the steps of exposing the core end portions to be joined, tapering the insulation of each cable frusto-conical adjacent its bared end in directions converging toward the exposed core wires thereof, terminating a portion of the conductor wires of each cable in each of a plurality of regularly spaced transverse planes so that corresponding wires abut and form continuous electrical paths when the cables are joined, providing spaced sleeves around the bare wires at each termination of the corresponding wire portions, constricting each sleeve so as to embed it in the wires without excess of thickness, wrapping the joint with dried insulation without excess of thickness, wraping the insulated cables at the joint with metallized paper at spaced portions to form a plurality of electrostatic spaced screens thereon and sheathing the cable with a sheath having a substantially uniform external diameter.

References Cited in the file of this patent

UNITED STATES PATENTS

| | | |
|---|---|---|
| 411,637 | Batchelor et al. | Sept. 24, 1889 |
| 2,058,929 | Vietzen | Oct. 27, 1936 |
| 2,161,423 | McConnell | June 6, 1939 |
| 2,461,079 | Peterson et al. | Feb. 8, 1949 |
| 2,523,313 | Lee | Sept. 26, 1950 |
| 2,695,853 | Foreit | Nov. 30, 1954 |

FOREIGN PATENTS

| | | |
|---|---|---|
| 132,334 | Austria | Mar. 10, 1933 |

OTHER REFERENCES

Article, "Long Splices for Ropes," published in Scientific American, January 17, 1891, volume 64 (No. 3), page 40.